US008729156B2

(12) United States Patent
Quinebeche et al.

(10) Patent No.: US 8,729,156 B2
(45) Date of Patent: *May 20, 2014

(54) POLYHYDROXYALKANOATE COMPOSITION EXHIBITING IMPROVED IMPACT RESISTANCE AT LOW LEVELS OF IMPACT MODIFIER

(71) Applicants: Sebastien Quinebeche, Bernay (FR); Zuzanna Donnelly, Wayne, PA (US); Mehdi M. Emad, Collegeville, PA (US)

(72) Inventors: Sebastien Quinebeche, Bernay (FR); Zuzanna Donnelly, Wayne, PA (US); Mehdi M. Emad, Collegeville, PA (US)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,529

(22) Filed: Nov. 6, 2012

(65) Prior Publication Data

US 2013/0131272 A1    May 23, 2013

Related U.S. Application Data

(63) Continuation-in-part of application No. 13/351,832, filed on Jan. 17, 2012, which is a continuation-in-part of application No. PCT/FR2010/051471, filed on Jul. 13, 2010.

(30) Foreign Application Priority Data

Jul. 17, 2009  (FR) .................................... 09 54956
Feb. 15, 2010 (FR) .................................... 10 51020

(51) Int. Cl.
*C08L 67/03* (2006.01)
*C08L 63/00* (2006.01)
*C08L 67/04* (2006.01)
*C08L 33/12* (2006.01)
*B29C 47/00* (2006.01)
*B29C 47/10* (2006.01)

(52) U.S. Cl.
USPC ........... 523/201; 525/191; 525/211; 525/212; 525/240

(58) Field of Classification Search
USPC ................... 523/201; 525/191, 211, 212, 240
See application file for complete search history.

(56) References Cited

U.S. PATENT DOCUMENTS

| 2,668,162 | A | 3/1952 | Lowe |
|---|---|---|---|
| 3,287,443 | A | 11/1966 | Saito et al. |
| 3,297,033 | A | 1/1967 | Schmitt et al. |
| 3,657,391 | A | 4/1972 | Curfman |
| 3,808,108 | A | 4/1974 | Owens |
| 3,985,704 | A | 10/1976 | Jones et al. |
| 4,096,202 | A | 6/1978 | Farnham et al. |
| 4,180,494 | A | 12/1979 | Fromuth et al. |
| 4,260,693 | A | 4/1981 | Liu |
| 4,299,928 | A | 11/1981 | Witman |
| 5,183,851 | A | 2/1993 | Visani et al. |
| 5,378,801 | A | 1/1995 | Reichert et al. |
| 5,773,520 | A | 6/1998 | Bertelo et al. |
| 7,354,973 | B2 | 4/2008 | Flexman |
| 7,381,772 | B2 | 6/2008 | Flexman et al. |
| 7,595,363 | B2 | 9/2009 | Uradnisheck et al. |
| 7,834,092 | B2 | 11/2010 | Uradnisheck et al. |
| 8,030,402 | B2 | 10/2011 | Hirasawa |
| 8,048,959 | B2 | 11/2011 | Uradnisheck |
| 2008/0071008 | A1 | 3/2008 | Smillie et al. |
| 2009/0076191 | A1 | 3/2009 | Aoyama et al. |
| 2010/0112357 | A1 | 5/2010 | Fine et al. |
| 2012/0271004 | A1* | 10/2012 | Quinebeche et al. ......... 525/190 |
| 2012/0316293 | A1* | 12/2012 | Bouilloux et al. ............ 525/190 |

FOREIGN PATENT DOCUMENTS

JP          9316310       12/1997

* cited by examiner

*Primary Examiner* — Nathan M Nutter
(74) *Attorney, Agent, or Firm* — Lynn B. Morreale

(57) ABSTRACT

The invention provides a composition exhibiting improved impact resistance at low levels of impact modifier. The composition comprises a polyhydroxyalkanoic acid and:
(A) an elastomeric compound of core-shell type wherein the amount of (A) is from 0.1 to 6% by mass of the composition; and
(B) and an olefinic copolymer comprising an ethylenic monomer bearing an epoxy function;
wherein the amount of (B) is from 0.01 to 0.6% by mass of the composition and the mass ratio of (A)/(B) is from 85/15 to 99.5/0.5.

16 Claims, No Drawings

POLYHYDROXYALKANOATE COMPOSITION EXHIBITING IMPROVED IMPACT RESISTANCE AT LOW LEVELS OF IMPACT MODIFIER

CROSS-REFERENCE TO RELATED APPLICATIONS

This application is a continuation-in-part of U.S. application Ser. No. 13/351,832, filed Jan. 17, 2012, which is a continuation-in-part of PCT/FR2010/051471, filed Jul. 13, 2010, from which priority is claimed under U.S.C. §365(c) and §119. This application also claims benefit to priority, under 35 U.S.C. §119, of French patent applications FR 0954956, filed Jul. 17, 2009, and FR 1051020, filed Feb. 15, 2010. The disclosure of each of these applications is incorporated herein by reference in its entirety for all purposes.

FIELD OF THE INVENTION

The present invention relates to a polyhydroxyalkanoate (PHA) composition with improved impact strength. Improved impact performance is realized at low levels of total impact modifier loadings.

BACKGROUND OF THE INVENTION

Polymers of polyhydroxyalkanoate or polyhydroxyalkanoic acid (PHA) type, such as polylactic acid (PLA), are polymers that may be obtained from a monomer of plant origin. They are of major interest on account of their biodegradable properties. However, they are particularly fragile polymers, which require reinforcing with respect to impact.

JP H-09-316310 describes PLA compositions containing ethylene-glycidyl methacrylate copolymers grafted with polystyrene or polydimethacrylate, or alternatively polyolefins grafted with maleic anhydride.

WO 2005/059031 describes a PLA composition comprising from 3% to 40% by mass of a copolymer of ethylene, of a carboxylic acid ester and of a glycidyl ester.

US 2008/0071008 discloses a polyhydroalkanoic acid composition comprising from 0.2% to 10% of core-shell compound with a refractive index of less than 1.5 and not comprising any vinyl aromatic monomer.

While these compositions show improved impact strength, this strength is not entirely satisfactory.

Moreover, some of these compositions have a fluidity that is markedly inferior to that of PHA. This substantial reduction in fluidity hampers the use, most particularly for thin and large-sized injection-molded parts.

The aim of the present invention is to propose a novel PHA composition that has good impact strength especially at low total loading levels of impact modifier.

SUMMARY OF THE INVENTION

The present invention relates to a polyhydroxyalkanoate (PHA) composition also comprising a core-shell elastomeric compound (A) and an olefinic copolymer (B) comprising an ethylenic monomer bearing an epoxy function.

This particular composition comprising an impact modifier combining a core-shell compound with an olefinic copolymer has exceptional impact properties that are, surprisingly, much better than those of the compositions of the prior art and in particular much better than compositions comprising an impact modifier consisting of an olefinic copolymer comprising an ethylenic monomer bearing an epoxy function or a core-shell compound.

The composition also has the advantage of having excellent fluidity during its use.

The composition also has the advantage of having excellent impact strength with compositions comprising poly(lactic)acid ("PLA") and mixtures of core-shell impact modifier and glycidal methacrylate containing ethylene copolymer ("GMA copolymer").

One embodiment of the invention provides a composition comprising a polyhydroxyalkanoic acid and:
(A) an elastomeric compound of core-shell type wherein the amount of (A) is from 0.1 to 6% by mass of the composition; and
(B) and an olefinic copolymer comprising an ethylenic monomer bearing an epoxy function;
wherein the amount of (B) is from 0.01 to 0.6% by mass of the composition and the mass ratio of (A)/(B) is from 85/15 to 99.5/0.5.

Another aspect of the invention provides a composition comprising a polylactic acid and:
(A) an elastomeric compound of core-shell type; and
(B) an olefinic copolymer comprising ethylene, glycidyl methacrylate and an alkyl (meth)acrylate in which the alkyl chain comprises from 1 to 30 carbon atoms wherein the amount of (A) is from 0.1 to 6% by mass of the composition;
wherein the amount of (B) is from 0.01 to 0.6% by mass of the composition, the amount of (A)+(B) is from 0.1 to 6% by mass of the composition, and the mass ratio of (A)/(B) is from 85/15 to 99.5/0.5.

The invention in another aspect provides a process for preparing such compositions, wherein pellets of an impact modifier blend of (A) and (B) are combined with the polyhydroxyalkanoic acid.

The ethylenic monomer bearing an epoxy function is preferentially glycidyl (meth)acrylate.

The copolymer (B) may be a copolymer of ethylene, of glycidyl methacrylate and optionally an alkyl acrylate and/or methacrylate in which the alkyl chain comprises from 1 to 30 carbon atoms, the latter monomers being combined under the term alkyl (meth)acrylate in the present description. The amount of alkyl (meth)acrylate may be within the range from 0 (i.e. containing none) to 40% relative to the total mass of said olefinic copolymer (B), advantageously from 5% to 35% and preferably from 20% to 30%.

The amount of ethylenic monomer bearing an epoxy function in said olefinic copolymer (B) is, for example, in the range from 0.1% to 20% relative to its total mass, advantageously from 2% to 15% and preferably from 5% to 10%.

The composition may also comprise an additional olefinic polymer (C) other than the olefinic copolymers comprising an ethylenic monomer bearing an epoxy function. Preferentially, this additional olefinic polymer (C) is a copolymer of ethylene and of an alkyl (meth)acrylate, a copolymer of ethylene and of a vinyl ester of a carboxylic acid, a copolymer of ethylene and of a (meth)acrylic acid or an ionomer, most preferentially a copolymer of ethylene and of an alkyl acrylate with an alkyl chain ranging from 1 to 20, for instance methyl acrylate, ethylene acrylate or n-butyl acrylate. In this case, the composition advantageously has a mass ratio (B)/(C) within the range from 90/10 to 10/90 or from 75/25 to 40/50.

Advantageously, the mass ratio (A)/((B)+optional (C)) in one embodiment of the invention is within the range from 90/10 to 10/90, for example 85/15 to 40/60, or advantageously from 80/20 to 50/50 or from 75/25 to 60/40. In another embodiment of the invention, however, C) is not present and the mass ration (A)/(B) is 85/15 or greater, preferably 90/10 or greater. For example, in this embodiment the mass ratio (A)/(B) may be 85/15 to 99.5/0.5 or 89/11 to 96/4. In another embodiment where C) is not present, the mass ratio (A)/(B) is 20/1 to 18/1, preferably 19/1. As used herein, the terms "mass" and "weight percent" have the same meaning.

The amount of modifier (A)+(B)+optional (C)) may, in one embodiment of the invention, be within the range from 1% to 30% by mass of the total composition, advantageously from 2% to 15% or from 3% to 9%. In another embodiment of the invention, the amount of modifier ((A)+(B) (where no C is present) may be from 0.5% to 6% by mass of the total composition, preferably from about 1% to about 5%, more preferably about 1% or about 5%.

The amount, in polymerized form, of ethylenic monomer comprising an epoxy function may, in one embodiment of the invention, be within the range from 0.01% to 2%, advantageously from 0.02% to 1% or from 0.03% to 0.7% relative to the mass of the total composition.

As regards the elastomeric core-shell compound (A), the glass transition temperature of the core polymer is preferentially less than 20° C., for example between −140° C. and 0° C. Preferentially, the glass transition temperature of the core polymer is greater than 20° C., for example between 30° C. and 250° C.

As regards the elastomeric core-shell compound (A), its shell part preferentially comprises, in polymerized form:
   an alkyl methacrylate in which the alkyl chain comprises from 1 to 12 and preferably from 1 to 4 carbon atoms;
   and/or a vinyl aromatic organic compound comprising from 6 to 12 carbon atoms, such as styrene;
   and/or acrylonitrile;
   this shell part possibly being crosslinked.

The core part of the core-shell compound (A) advantageously comprises, in polymerized form:
   a conjugated diene comprising from 4 to 12 and preferably from 4 to 8 carbon atoms;
   or an alkyl acrylate in which the alkyl chain comprises from 1 to 12 and preferably from 1 to 8 carbon atoms.

The core-shell compound (A) may be chosen from:
   a compound with a core comprising butadiene and a shell comprising methyl methacrylate, ethyl acrylate, butyl acrylate, methacrylic acid and/or styrene;
   a compound with a core comprising butyl acrylate, n-octyl acrylate and/or 2-ethylhexyl acrylate and a shell comprising methyl methacrylate;
   a compound with a core comprising butadiene and a shell comprising a mixture of acrylonitrile and styrene.

As regards the core-shell compound, the mass amount of core is advantageously within the range from 10% to 99%, for example from 60% to 95%, of the total mass of the core-shell compound.

The particle size of the core-shell compounds is advantageously between 50 and 600 nm.

Preferentially, the PHA is chosen from polylactic acid (PLA) and polyglycolic acid (PGA).

A subject of the invention is also a process for preparing the modified PHA composition, in which the mixture of PHA, of (A), of (B), of the optional (C) with, optionally, one or more additives such as a nucleating agent, is prepared by extrusion.

According to one embodiment of the process of the invention, the following are performed:
   mixing of (A), (B) and optional (C) to form an impact modifier in a first step, and then
   in a second step, mixing of the impact modifier obtained from the first step (which may, for example, be in the form of pellets) with PHA.

According to another process for preparing the abovementioned composition that is the subject of the present invention, the following are performed:
   a first step of manufacturing the impact modifier by mixing at a temperature at which the copolymer is in molten form and at a maximum temperature within the range from 60 to 180° C.;
   a second step of manufacturing the polyhydroxyalkanoic acid (PHA) composition by extrusion or by mixing the impact modifier obtained in the first step and said PHA.

Advantageously, the step for manufacturing the impact modifier of the first step is performed such that the maximum temperature is within the range from 70 to 140° C.

According to one embodiment, the step for manufacturing the abovementioned impact modifier of the first step is performed by extrusion in a twin-screw or single-screw extruder, preferentially a single-screw extruder. According to one embodiment, the step for manufacturing the impact modifier of the first step is performed by mixing in molten form in a co-rotating twin-screw extruder or a counter-rotating twin-screw extruder or a co-kneader or an internal mixer or a single-screw extruder, preferentially in a single-screw extruder. It is understood that all the steps for manufacturing the impact modifier, including mixing in melt form, are considered herein as extrusions. The impact modifier may be prepared in the form of pellets, using pelletization methods generally known in the polymer processing art.

Preferentially, the residence time of the impact modifier in the first step is within the range from 10 to 300 seconds.

According to one embodiment, the second step for manufacturing the mixture of the impact modifier obtained in the first step and of the abovementioned PHA may be performed such that the mixing temperature is within the range from 180 to 320° C. Pellets of the impact modifier and pellets of PHA may be combined in the proportions needed to attain the desired level of impact modifier in the final composition and subjected to melt processing so as to intimately mix the components and achieve homogeneous dispersion of the components of the impact modifier in the PHA matrix.

One subject of the invention is a part or object, for instance wrapping, comprising the modified PHA composition.

The invention also relates to a process for manufacturing the part or object, comprising a step of forming said composition, for example by injection-molding, pressing or calendering, said part or said object optionally undergoing an annealing step.

DETAILED DESCRIPTION OF THE INVENTION

The present invention relates to a polyhydroxyalkanoate (PHA) composition also comprising a core-shell compound (A) and a polymer comprising an ethylenic monomer bearing an epoxy function (B).

According tot he invention, when one of the polymers of the composition or a composition "comprises a monomer", this means that it is present in polymerized form in said polymer or one (or more) polymer(s) of said composition.

Polymers of PHA type are biodegradable polymers. Some of them are also biorenewable, the monomers being produced by bacterial fermentation processes or alternatively extracted from plants. The term "biodegradable" applies to a material if it can be degraded by microorganisms. The result of this degradation is the formation of water, $CO_2$ and/or $CH_4$ and, optionally, of byproducts (residues, new biomass) that are not toxic to the environment. It is possible, for example, to use standard EN13432 to determine whether the material is biodegradable. To determine whether a polymer is "biorenewable", standard ASTM D 6866 may be used. Biorenewable polymers are characterized in that they comprise carbon of renewable origin, i.e. $^{14}C$. Specifically, all the carbon samples taken from live organisms and in particular from the plant material used to form the biorenewable polymers are a mixture of three isotopes: $^{12}C$, $^{13}C$ and $^{14}C$ in a $^{14}C/^{12}C$ ratio that is kept constant by continuous exchange of the carbon with the environment and which is equal to $1.2 \times 10^{-12}$. Although $^{14}C$ is radioactive and its concentration thus decreases over time, its half-life is 5730 years, and as such it is considered that the $^{14}C$ content is constant from the time of extraction of the plant material up to the manufacture of the biorenewable polymers and even up to the end of their use. For example, it may be considered that the polymer is biorenewable when the $^{14}C/^{12}C$ ratio is greater than or equal to $1 \times 10^{-12}$.

The $^{14}C$ content of biorenewable polymers may be measured, for example, according to the following liquid scintillation spectrometry of mass spectrometry techniques. These methods for measuring the $^{14}C$ content of materials are described precisely in standards ASTM D 6866 (especially D6866-06) and in standards ASTM D 7026 (especially 7026-04). These methods measure the $^{14}C/^{12}C$ ratio of a sample and compare it with the $^{14}C/^{12}C$ ratio of a reference sample of 100% renewable origin, to give a relative percentage of carbon of renewable origin in the sample.

The measuring method preferentially used in the case of biorenewable polymers is mass spectrometry described in standard ASTM D6866-06 (accelerator mass spectroscopy).

PHAs are polymers comprising hydroxyalkanoic acid units, for example containing from 2 to 10 carbon atoms. Examples that may be mentioned include the polymer comprising 6-hydroxyhexanoic acid known as polycaprolactone (PCL), polymers comprising 3-hydroxyhexanoic acid, 4-hydroxyhexanoic acid or 3-hydroxyheptanoic acid. Polymers containing 5 carbon atoms or less, for example polymers comprising glycolic acid (PGA), lactic acid (PLA), 3-hydroxypropionate, 2-hydroxybutyrate, 3-hydroxybutyrate (PHB), 4-hydroxybutyrate, 3-hydroxyvalerate, 4-hydroxyvalerate and 5-hydroxyvalerate may be noted in particular. Preferred polymers are PGA, PCL, PLA and PHB. The PHAs may be aliphatic.

PHAs may also be copolymers, i.e. they may comprise a first hydroxyalkanoic acid and another unit that may be either a second hydroxyalkanoic acid different than the first, or another monomer such as diols, for instance ethylene glycol, 1,3-propanediol and 1,4-butanediol or diacids such as succinic acid, adipic acid and terephthalic acid. For example, the invention includes both homopolymers and copolymers of PLA, wherein the copolymer comprises PLA and other monomers, including for example, another unit that may be either a second hydroxyalkanoic acid different than the first, or another monomer such as diols, for instance ethylene glycol, 1,3-propanediol and 1,4-butanediol or diacids such as succinic acid, adipic acid and terephthalic acid.

The compositions of the invention may also comprise mixtures of these polymers, including for example mixtures of PLA and other PHA's.

PHAs are often polymerized in bulk. A PHA may be synthesized by dehydration and condensation of the hydroxyalkanoic acid. It may also be synthesized by dealcoholization and condensation of an alkyl ester of a hydroxyalkanoic acid or by polymerization by ring opening of a cyclic derivative of the corresponding lactone or of the dimer of the cyclic ester.

Bulk polymerization is generally performed via a batch or continuous process. As examples of continuous processes for manufacturing PHA, mention may be made of the processes in patent applications JP-A 03-502115, JP-A 07-26001 and JP-A 07-53684. U.S. Pat. Nos. 2,668,162 and 3,297,033 describe batch processes.

As regards the core-shell copolymer (A), it is in the form of fine particles with a core made of soft polymer and at least one shell made of hard polymer and the size of the particles is generally less than a micrometer and advantageously between 50 and 600 nm, more preferentially between 250 and 400 nm.

Preferentially, the polymer of the core has a glass transition temperature of less than 20° C., for example between −140° C. and 0° C. and preferentially between −120° C. and −30° C. Preferentially, the polymer of the shell has a glass transition temperature of greater than 20° C., for example between 30° C. and 250° C.

The glass transition temperatures of the polymers of the composition may be measured according to standard ISO 11357-2:199.

Examples of core polymers that may be mentioned include rubber, homopolymers and copolymers of butadiene, butyl acrylate, methyl methacrylate, ethyl acrylate, and/or butyl acrylate, isoprene homopolymers, isoprene-butadiene copolymers, copolymers of isoprene with not more than 98% by weight of a vinyl monomer and copolymers of butadiene with not more than 98% by weight of a vinyl monomer. The vinyl monomer may be styrene, an alkylstyrene, acrylonitrile, an alkyl (meth)acrylate, alkyl acrylate, butadiene or isoprene. The core polymer may also comprise siloxane, optionally copolymerized with an alkyl acrylate. The core of the core-shell copolymer may be totally or partially crosslinked. To do this, it suffices to add at least difunctional monomers during the preparation of the core, and these monomers may be chosen from poly(meth)acrylic esters of polyols such as butylene di(meth)acrylate and trimethylolpropane trimethacrylate. Other multifunctional monomers are, for example, divinylbenzene, trivinylbenzene, vinyl acrylate and vinyl methacrylate, and triallyl cyanurate. The core may also be crosslinked by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth) acrylic acid and glycidyl methacrylate. Crosslinking may also be performed using the intrinsic reactivity of monomers, for example dienes.

The shell(s) are homopolymers or copolymers of styrene, of an alkylstyrene of C1-C4 alkyl (meth)acrylate, of methyl methacrylate, of butyl acrylate, of ethyl acrylate, or copolymers comprising at least 70% by weight of one of the preceding monomers and at least one comonomer chosen from the other preceding monomers, another alkyl (meth)acrylate, vinyl acetate and acrylonitrile. The shell may be functionalized by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid, glycidyl methacrylate, hydroxyethyl methacrylate and alkyl(meth)acrylamides. Examples that may be mentioned include core-shell copolymers with a shell made of polystyrene and core-shell copolymers with a shell made of PMMA. The shell may also contain imide functions, either by copolymerization with a maleimide, or by chemical modification of the PMMA with a primary amine. Advantageously, the molar percentage of imide functions is from 30% to 60% (relative to the shell as a whole). Core-shell copolymers containing two shells also exist, one made of polystyrene and the other on the exterior made of PMMA. Examples of copolymers and of processes for preparing them are described in the following patents. U.S. Pat. Nos. 4,180,494, 3,808,180, 4,096,202, 4,260,693, 3,287,443, 3,657,391, 4,299,928, 3,985,704, 5,773,520.

The core represents, for example, in this invention, 5% to 95% by weight of the core-shell compound, preferably from 50% to 95%, more preferably from 60% to 90%, and the shell 95% to 5% by weight, more preferably from 50% to 5%, and more preferably from 40% to 10%.

An example of a copolymer that may be mentioned is the one consisting of (i) from 50 to 95 parts of a core comprising, in moles, at least 93% butadiene, 5% styrene and 0.5% to 1% divinylbenzene and (ii) from 5 to 50 parts of two shells essentially of the same weight, the inner one made of polystyrene and the outer one made of PMMA.

Preferentially, core-shell compounds with a core made of butyl acrylate copolymer and a shell made of PMMA may be used. These compounds have the advantage of being particularly transparent.

Also preferred are core-shell compounds with a core comprising rubber, butyl acrylate homopolymer or copolymer, butadiene homopolymer or copolymer, and a shell comprising one or more of methyl methacrylate, ethyl acrylate, and/or butyl acylate.

All these core-shell compounds are occasionally referred to as soft/hard on account of the elastomeric core. It would not constitute a departure from the context of the invention to use core-shell copolymers such as hard/soft/hard copolymers, i.e. copolymers which have in this order a hard core, a soft shell and a hard shell. The hard parts may consist of polymers of the shell of the preceding soft/hard copolymers and the soft part may consist of polymers of the core of the preceding soft/hard copolymers.

Examples that may be mentioned include those described in EP 270 865, and those consisting of, in this order:
a core made of a copolymer of methyl methacrylate and of ethyl acrylate,
a shell made of a copolymer of butyl acrylate and of styrene,
a shell made of a copolymer of methyl methacrylate and of ethyl acrylate.

Other types of core-shell copolymer also exist, such as hard (core)/soft/semi-hard copolymers. Compared with the preceding copolymers, the difference lies in the "semi-hard" outer shell which consists of two shells: one intermediate and the other outer. The intermediate shell is a copolymer of methyl methacrylate, of styrene and of at least one monomer chosen from alkyl acrylates, butadiene and isoprene. The outer shell is a PMMA homopolymer or copolymer.

Examples that may be mentioned include those consisting of, in this order:
a core made of a copolymer of methyl methacrylate and of ethyl acrylate,
a shell made of a copolymer of butyl acrylate and of styrene,
a shell made of a copolymer of methyl methacrylate, of butyl acrylate and of styrene,
a shell made of a copolymer of methyl methacrylate and of ethyl acrylate.

Compounds (A) are sold by the Arkema under the brand names Biostrength®, Durastrength® and Clearstrength®.

The polymer (B) comprises an ethylenic monomer bearing an epoxy function. Preferentially, it is a statistical copolymer. The ethylenic monomer bearing an epoxy function may be an unsaturated epoxide such as:
aliphatic glycidyl esters and ethers such as allyl glycidyl ether, vinyl glycidyl ether, glycidyl maleate and itaconate, and glycidyl (meth)acrylate, and
alicyclic glycidyl esters and ethers such as 2-cyclohexene-1-glycidyl ether, cyclohexene-4,5-diglycidyl carboxylate, cyclohexene-4-glycidyl carboxylate, 5-norbornene-2-methyl-2-glycidyl carboxylate and endocis-bicyclo-(2.2.1)-5-heptene-2,3-diglycidyl dicarboxylate.

Glycidyl methacrylate is preferred as ethylenic monomer bearing an epoxy function.

Preferentially, the polymer (B) is an olefinic copolymer comprising an ethylenic monomer bearing an epoxy function, i.e. it is a copolymer of the abovementioned ethylenic monomer and of at least one α-olefin, which may comprise from 2 to 20 carbon atoms, such as ethylene or propylene, preferentially ethylene.

The olefinic copolymer may also comprise at least one monomer different than the abovementioned α-olefins and than the ethylenic monomer bearing an epoxy function. Non-limiting examples that may be mentioned include:
a conjugated diene, for instance 1,4-hexadiene;
carbon monoxide;
an unsaturated carboxylic acid ester, for instance alkyl (meth)acrylates;
a saturated carboxylic acid vinyl ester, for instance vinyl acetate or vinyl propionate.

According to one advantageous mode, the olefinic copolymer comprises an alkyl (meth)acrylate. The alkyl chain may contain up to 24 carbons. Those in which the alkyl chain comprises from 1 to 12, advantageously from 1 to 6 or even from 1 to 4 carbon atoms are preferred.

Advantageously, the C1 to C4 alkyl (meth)acrylates are preferred, including for example, n-butyl acrylate, isobutyl acrylate, 2-ethylhexyl acrylate, ethyl acrylate and methyl acrylate. Preferentially, the alkyl (meth)acrylates are n-butyl acrylate, ethyl acrylate and methyl acrylate. Most preferably, it is poly methyl acrylate or poly butyl acrylate.

The polymers that are most preferred are ethylene—C1 to C4 alkyl (meth)acrylate—glycidyl (poly) methacrylate copolymers, ethylene-glycidyl methacrylate copolymers, and ethylene-glycidyl (poly) butylacrylate copolymers.

The amount of monomer other than the ethylenic monomer bearing an epoxy function and other than the α-olefins, for instance alkyl (meth)acrylate, may be within the range from 0 (i.e. it does not comprise any) to 50% relative to the total mass of said olefinic copolymer (B), advantageously from 5% to 35% and preferably from 20% to 30%.

The amount of ethylenic monomer bearing an epoxy function in said olefinic copolymer (B) is, for example, in the range from 0.1% to 20% relative to its total mass, advantageously from 2% to 15% and preferably from 5% to 10%. Also preferred is glycidyl methacrylate copolymer comprising glycidyl methacrylate, ethylene, and acrylic portions, having 10 weight percent or less of glycidyl methacrylate in the copolymer, and wherein the acrylic portions comprise poly methacrylate and/or poly butylacrylate at from 0 to 50 weight percent.

Copolymers (B) are sold by Arkema under the brand name Lotader®.

The composition of the invention may also comprise an additional olefinic polymer (C), for instance ethylene copolymers other than (B), i.e. not comprising any monomer bearing an epoxy function. These may be chosen from copolymers comprising ethylene and a vinyl ester or copolymers comprising ethylene and an alkyl (meth)acrylate, such as copolymers consisting of ethylene and an alkyl (meth)acrylate. The alkyl chain of the (meth)acrylate may contain up to 20 carbons. Those in which the alkyl chain comprises from 1 to 12, advantageously from 1 to 6 or even from 1 to 4 carbon atoms are preferred. Advantageously, the alkyl (meth)acrylates are n-butyl acrylate, isobutyl acrylate, 2-ethylhexyl acrylate, ethyl acrylate and methyl acrylate. Preferentially, the alkyl (meth)acrylates are n-butyl acrylate, ethyl acrylate and methyl acrylate. Preferentially, the amount of alkyl (meth)acrylate ranges from 1% to 40% relative to the total mass of said olefinic copolymer (C), advantageously from 5% to 35% and preferably from 20% to 30%.

Copolymers (C) are sold by Arkema under the brand name Lotryl®.

The amounts of the various monomers present in the various polymers of the invention may be measured by infrared spectroscopy, for example using the method described in standard ISO8985.

The processes for manufacturing the copolymers (B) and (C) are known. They may be manufactured via high-pressure radical polymerization, for example in a tubular or autoclave reactor.

According to one aspect of the invention, the polyhydroxyalkanoic acid (PHA) composition also comprises:
(A) an elastomeric compound of core-shell type;
(B) a copolymer chosen from copolymers of ethylene and of glycidyl methacrylate; and
(C) a copolymer of ethylene and of an alkyl (meth)acrylate in which the alkyl chain comprises from 1 to 20 carbon atoms.

The composition may also comprise additives for improving certain properties of the PHA composition, such as nucleating agents, plasticizers, dyes, UV absorbers, stabilizers, antioxidants, fillers, flame retardants, lubricants, antiblocking agents, mold-release agents or additives for facilitating the process, commonly known as "processing aids".

The composition according to the invention may be manufactured by mixing the various constituents via standard thermoplastic processing means, for instance extrusion or blending. Internal mixers with paddles or rotors, an external mixer, and co-rotating or counter-rotating single-screw or twin-screw extruders may be used. In one embodiment, the composition is prepared at a temperature greater than or equal to the glass transition temperature of the PHA, or even above. The composition may be prepared, for example, at a temperature within the range from 160° C. to 260° C.

According to one embodiment of the process of the invention, a step of mixing of an impact modifier into the PHA is performed, said impact modifier being a mixture comprising (A), (B) and the optional (C).

Since compound (A) is pulverulent, the process for manufacturing the PHA composition is facilitated by mixing (A) with (B) and the optional (C), the impact modifier thus obtained then possibly being in the form of granules that are easier to manipulate during the PHA transformation process.

In one embodiment of the invention, a blend of (A), (B) and, optionally, (C) is prepared in the form of pellets. The pelletized impact modifier blend is then combined with the PHA to provide a composition in accordance with the invention. This method has been found to yield compositions having better, and more consistent, impact properties as well as more consistent optical properties, as compared to compositions prepared by adding (A), (B) and optional (C) separately to the PHA.

Another subject of the invention is a part or an object, such as a wrapping, a film or a sheet, manufactured from the composition according to the invention.

To manufacture this part or this object, the known molding techniques may be used, such as a press or an injection-molded press, or alternatively the known extrusion-blow molding techniques. The films or sheets may also be manufactured via the techniques of cast-film extrusion, blown-film extrusion or calendering.

The process for manufacturing this part may also comprise an annealing sep for crystallizing the PHA and thus for improving its mechanical properties.

Examples of compositions will now be described in the examples that follow; these examples are given as illustrations and do not in any way limit the scope of the claimed invention.

EXAMPLES

To prepare examples of the composition and the structures according to the invention, the following products were used:
(a1): core-shell compound based on butadiene, methyl methacrylate, ethyl acrylate and butyl acrylate;
(a2): core-shell compound based on butyl acrylate and methyl methacrylate;
(a3): core-shell compound comprising acrylonitrile, butadiene and styrene;
(b): ethylene-methyl acrylate-glycidyl methacrylate copolymer comprising, by weight, 25% acrylate and 8% glycidyl methacrylate (Lotader® AX 8900) whose melting point measured by DSC (ISO 11357-03) is 64° C.;
(c): ethylene-butyl acrylate copolymer comprising, by weight, 30% acrylate (Lotryl® 30BA02) whose melting point measured by DSC (ISO 11357-03) is 78° C.;
(d): polylactic acid 2002D sold by NatureWorks®.

Compositions (4) and (5) according to the invention and comparative compositions (1), (2) and (3) comprise the constituents (a), (b1), (b2), (b3), (c) and (d) in the proportions given in Table 1.

Compositions (1) to (5) were prepared in a single step. The mixing of the constituents in the ratio given in Table 1 is performed by extrusion. The extrusion is performed in an extruder of co-rotating twin-screw type with a diameter of 16 mm and an L/D ratio of 25 (Haake PTW16/25). The maximum mixture temperature is 240° C.

Since the constituents (b1), (b2) and (b3) are powders and the extruder mentioned previously is equipped with only one metering device, it is necessary to mill the constituents (a) and (d) by cryomilling until a fine powder is obtained, so as to obtain correct metering of the constituents into the extruder for the preparation of the mixtures (2) to (5).

The compositions are then injected at 200° C. into a mold regulated at 30° C. by means of an injector press of Krauss Maffei 60-210 B1 type.

The notched Charpy impact properties are measured according to standard ISO 179:2000 after annealing the samples for 1 hour at 110° C. to crystallize the polylactic acid. The higher the Charpy impact value, the better the impact strength. These properties were measured at room temperature (23° C.) and under cold conditions (0° C. and/or −40° C.). The values obtained are collated in Table 2.

The notched Charpy impact properties are also measured at room temperature according to standard ISO 179:2000 without annealing. The values obtained are collated in Table 3.

TABLE

| Compositions | Mass percentage (a)/ ((a) + (b) + (c) + (d)) | Mass percentage (b)/ ((a) + (b) + (c) + (d)) | Mass percentage (c)/ ((a) + (b) + ((c) + (d)) |
|---|---|---|---|
| (1)  | 0%     | 2%   | 8% |
| (2)  | a3:10% | 0%   | 0% |
| (3)  | a1:10% | 0%   | 0% |
| (4)  | a1:7%  | 3%   | 0% |
| (5)  | a1:5%  | 5%   | 0% |
| (6)  | a2:7.5%| 7.5% | 0% |
| (7)  | a2:3%  | 3%   | 0% |
| (8)  | 0%     | 10%  | 0% |
| (9)  | a2:10% | 0%   | 0% |
| (10) | a2:5%  | 5%   | 0% |
| (11) | a2:7%  | 3%   | 0% |

TABLE 2

| Compositions | Charpy impact 23° C. | Charpy impact 0° C. | Charpy impact −40° C. |
|---|---|---|---|
| (1)  | 11   | Not measured | 6 |
| (2)  | 13.5 | Not measured | 6.5 |
| (3)  | 38   | 15           | 9 |
| (4)  | 68   | 39           | 10 |
| (5)  | 54   | 39           | 10 |
| (6)  | 62   | Not measured | Not measured |
| (7)  | 20   | Not measured | Not measured |
| (8)  | 9    | Not measured | 4 |
| (9)  | 8    | Not measured | 4 |
| (10) | 40   | 14           | 5 |
| (11) | 20   | 10           | 4 |

TABLE 3

(without annealing)

| Compositions | Choc Charpy 23° C. | Notched Izod [ft lb/in] 23 C. |
|---|---|---|
| (1)  | 5  | — |
| (2)  | 9  | — |
| (3)  | 14 | — |
| (4)  | 27 | — |
| (6)  | 50 | — |
| (8)  | 5  | 0.98 |
| (9)  | 6  | 1.52 |
| (10) | 20 | 5.06 |
| (11) | 13 | 4.62 |

The compositions prepared according to the invention have improved impact properties when compared with those obtained from the prior art.

Three additional exemplary compositions in accordance with the invention are described in Table 4. In these examples, the polyhydroxyalkanoic acid is a polylactic acid, (A) is a core-shell compound made in accordance with the present invention, and (B) is an ethylene/C1-4 methacrylate/glycidyl methacrylate copolymer. The amounts of each component are in mass % based on the total mass of the composition.

TABLE 4

| Component | Ex. 12 | Ex. 13 | Ex. 14 |
|---|---|---|---|
| PLA | 99  | 99   | 95 |
| (A) | 0.9 | 0.95 | 4.75 |
| (B) | 0.1 | 0.05 | 0.25 |

Examples 15-26 (Table 5) were prepared in accordance with the following procedure (Examples 15-18 are comparative examples, while Examples 19-26 demonstrate various embodiments of the invention). A blend of 95-99 mass % polylactide containing 1-5 mass % total impact modifier (core-shell compound+copolymer containing glycidyl methacrylate) was formed by melt extrusion using a twin-screw extruder. The processing temperature and melt temperature during extrusion were maintained above the melting temperature of the polylactide (>170 C) to ensure a homogeneous melt. The extrudate was cast into a sheet (15 mil in thickness) using a three roll stack and puller. Dart drop impact measurements were performed with a Gardner Impact tester with a 2 lb hemispherical impactor head according to ASTM D5420. The data shown in Table 5 were obtained. The amounts of PLA, core-shell compound (A), and glycidyl methacrylate copolymer (B) are in mass %, based on the total mass of the composition.

TABLE 5

| Example | PLA, % | (A), % | (B), % | Mean failure energy, in lb |
|---|---|---|---|---|
| 15 | 98 | 2.00 | 0    | 1.50 |
| 16 | 97 | 3.00 | 0    | 3.20 |
| 17 | 96 | 4.00 | 0    | 6.40 |
| 18 | 95 | 5.00 | 0    | 8.83 |
| 19 | 98 | 1.80 | 0.20 | 6.70 |
| 20 | 97 | 2.70 | 0.30 | 7.17 |
| 21 | 96 | 3.60 | 0.40 | 10.39 |
| 22 | 95 | 4.50 | 0.50 | 8.60 |
| 23 | 98 | 1.90 | 0.10 | 7.79 |
| 24 | 97 | 2.85 | 0.15 | 8.40 |
| 25 | 96 | 3.80 | 0.20 | 10.17 |
| 26 | 95 | 4.75 | 0.25 | 9.80 |

The results shown in Table 5 demonstrate that the inclusion of even relatively small amounts of a glycidyl methacrylate copolymer (0.10-0.50 mass %) generally leads to significant improvement in the impact properties of a PLA-based composition also containing a core-shell compound. That is, when the total mass of impact modifier ((A)+(B)) is held constant at 2, 3 or 4%, the mean failure energy value increases significantly when a glycidyl methacrylate copolymer is introduced at an (A)/(B) mass ratio of 90/10 (Examples 12-22) or 95/5 (Examples 23-26).

What is claimed is:

1. A composition comprising a polyhydroxyalkanoic acid and:
    (A) an elastomeric core-shell compound; and
    (B) and an olefinic copolymer comprising an ethylenic monomer bearing an epoxy function;
    wherein the amount of (B) is from 0.01 to 0.6% by mass of the composition and the mass ratio of (A)/(B) is from 85/15 to 99.5/0.5.

2. The composition as claimed in claim 1, wherein the ethylenic monomer bearing an epoxy function is glycidyl (meth)acrylate.

3. The composition as claimed in claim 1, wherein (B) is a copolymer of ethylene, of glycidyl methacrylate and optionally of an alkyl (meth)acrylate in which the alkyl chain comprises from 1 to 30 carbon atoms.

4. The composition as claimed in claim 1, additionally comprising an additional olefinic polymer (C) other than the olefinic copolymer comprising an ethylenic monomer bearing an epoxy function.

5. The composition as claimed in claim 4, wherein the additional olefinic polymer (C) is a copolymer of ethylene and of an alkyl (meth)acrylate, a copolymer of ethylene and a carboxylic acid vinyl ester, a copolymer of ethylene and of a (meth)acrylic acid or an ionomer, preferentially a copolymer of ethylene and of an alkyl acrylate with an alkyl chain ranging from 1 to 20.

6. The composition as claimed in claim 4, in which the mass ratio (B)/(C) is within the range from 90/10 to 10/90.

7. The composition as claimed in claim 1, wherein the mass ratio (A)/(B) is within the range from 89/11 to 96/4.

8. The composition as claimed in claim 1, wherein the amount of (A)+(B) is within the range from 0.5 to 6% by mass of the composition.

9. The composition as claimed in claim 1, in which the amount, in polymerized form, of ethylenic monomer comprising an epoxy function is within the range from 0.005% to 0.05% by mass of the composition.

10. The composition as claimed in claim 1, wherein the polymer of the core of the core-shell compound (A) has a glass transition temperature of less than 20° C. and the polymer of the shell has a glass transition temperature of greater than 20° C.

11. The composition as claimed in claim 1, wherein the mass amount of core is within the range from 60% to 95% of the total mass of the core-shell compound.

12. The composition as claimed in claim 1, wherein the core-shell compound is in particle form and the particle size of the core-shell compound is between 50 and 600 nm.

13. The composition as claimed in claim 1, wherein the polyhydroxyalkanoic acid is selected from the group consisting of polylactic acid (PLA) and polyglycolic acid (PGA).

14. The composition as claimed in claim 1, wherein the mass ratio of (A)/(B) is greater than 90/10.

15. A composition comprising a polylactic acid and:
(A) an elastomeric compound of core-shell type; and
(B) an olefinic copolymer comprising ethylene, glycidyl methacrylate and an alkyl (meth)acrylate in which the alkyl chain comprises from 1 to 30 carbon atoms;
wherein the amount of (B) is from 0.05 to 0.6% by mass of the composition, the amount of (A)+(B) is from 0.5 to 6% by mass of the composition, and the mass ratio of (A)/(B) is from 85/15 to 99/1.

16. The composition as claimed in claim 1, wherein pellets of an impact modifier comprising a blend of (A) and (B) are combined with polyhydroxyalkanoic acid.

* * * * *